FIG. 8A
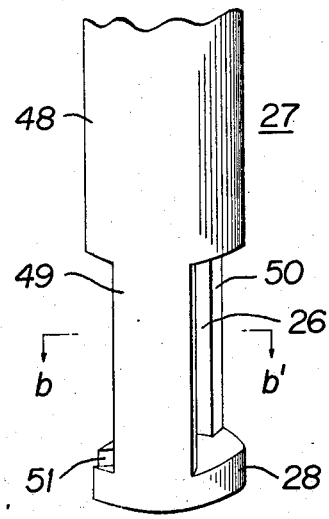
FIG. 9A
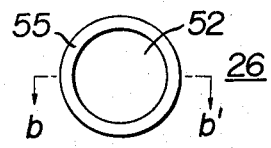
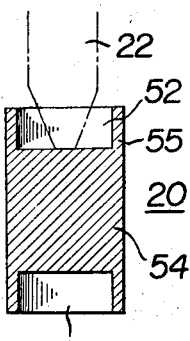
FIG. 9B
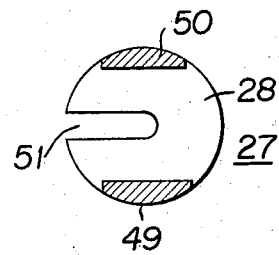
FIG. 8B

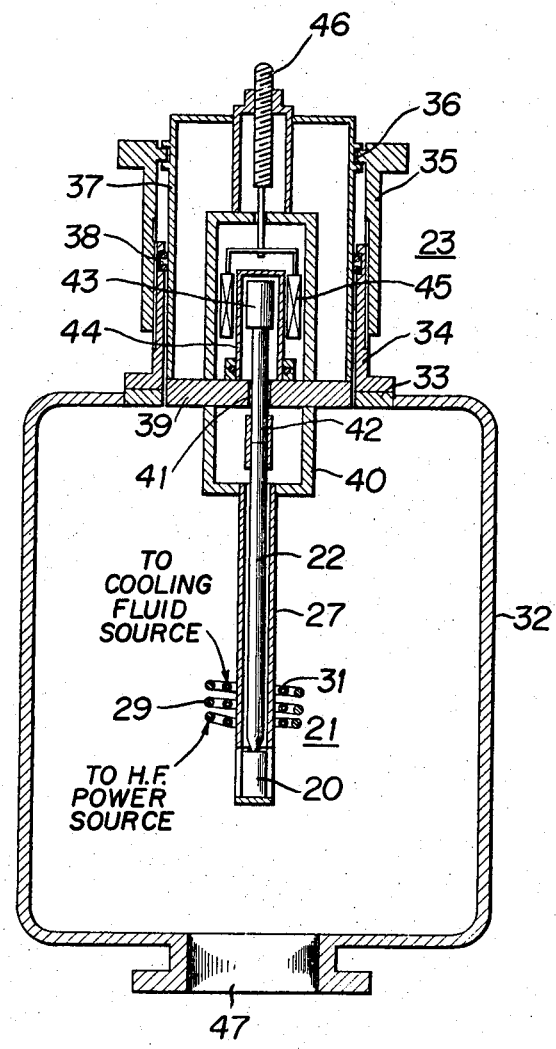

United States Patent Office 3,377,838
Patented Apr. 16, 1968

3,377,838
APPARATUS FOR MEASURING VARIOUS TRANS-
FORMATION CHARACTERISTICS OF METALLIC
MATERIALS
Shogo Kanazawa, Tokyo, Keiji Konno, Sagamihara-shi, and Kiyoshige Shimizu and Shingo Kosuge, Tokyo, Japan, assignors to Fuji Electronics Industrial Co., Ltd., and Fuji Iron and Steel Co., Ltd., both of Tokyo, Japan, both corporations of Japan
Filed Jan. 26, 1965, Ser. No. 428,090
Claims priority, application Japan, Feb. 5, 1964, 39/5,842
4 Claims. (Cl. 73—16)

ABSTRACT OF THE DISCLOSURE

An elongated quartz tube is suspended in a vacuum vessel. A sample chamber is defined at the lower end thereof including openings in the chamber walls for passage of a cooling gas to the sample and a slit in the chamber floor so that the sample placed on a knife edge can be deposited in the sample chamber. Around the sample chamber is a high frequency induction heating coil and between the heating coil and the sample chamber is a cooling tube connected to a quenching gas so as to rapidly quench the sample when heated. Disposed in the quartz tube over the sample is a quartz rod one end of which contacts the sample and mounted on the other end is a magnetic core surrounded by a differential transformer. Programming means control the heating and quenching, recording the expansion of the sample over a predetermined programme.

---

This invention relates to novel means for measuring and recording various transformation characteristics of metallic materials such as thermal expansions, isothermal transformations, continuous cooling transformations and the like.

It is an object of this invention to provide a novel means wherein various transformation characteristics of metallic materials such as thermal expansions, isothermal transformations, continuous cooling transformations and the like can be measured and recorded by the same apparatus.

A further object of this invention is to selectively and automatically measure any one of the above mentioned various transformation characteristics.

A still further object of this invention is to effect said automatic measurement at a high accuracy and to provide accurate plots of said various transformation characteristics.

Further objects and advantages of the present invention will become apparent and this invention will be better understood from the following description, reference being made to the accompanying drawings. The features of novelty which characterize the invention are set forth in the appended claims annexed to and forming a part of this specification.

In the drawings:

FIG. 7 is a vertical sectional view showing a partial construction of the device shown in FIG. 6;

FIG. 8A is a perspective view of the lower portion of a quartz tube utilized in connection with the device shown in FIG. 7 and is adapted to support a metal sample;

FIG. 8B is a cross-sectional view of the quartz tube shown in FIG. 8A, taken along a line 8B—8B of FIG. 8A;

FIG. 9A is a top plan view of a metal sample to be mounted in the quartz tube shown in FIG. 8;

FIG. 9B shows a vertical section of the metal sample, taken along a line 9B—9B of FIG. 9A;

Figure 1:
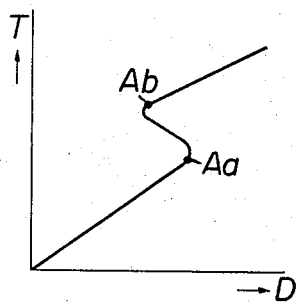
FIG. 1 shows a curve illustrating the relation between temperature and expansion of a common metal, steel for example.

Generally, heat treatment has a great influence upon the physical properties of a metallic material, steel for example. Accordingly, in order to subject steel to a heat treatment under best conditions it is essential to know the continuous transformation characteristic curve, the isothermal transformation characteristic curve or a general transformation characteristic curve of the metal or steel to be heat treated. More particularly, as is well known in the art the relation between temperature T and the amount of expansion D of steel is represented by a curve as shown in FIG. 1. Thus, as steel is heated continuously it will expand along a straight line until a point A$a$ is reached but as the steel is further heated beyond the point A$a$ it will shrink until a point A$b$ is reached owing to its transformation. Beyond the point A$b$ the steel will again expand at a uniform rate along a second straight line.

Figure 2:
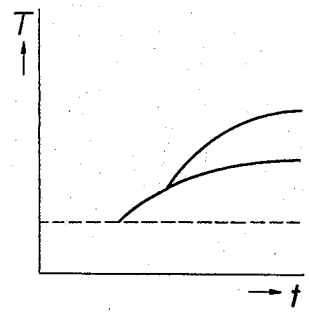
FIG. 2 shows the continuous cooling transformation characteristic curve of steel to illustrate the relation between temperature and time.
Figure 3:
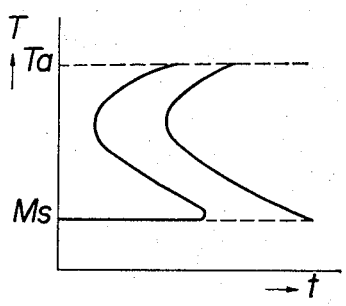
FIG. 3 shows the isothermal transformation characteristic curve of steel to illustrate the relation between temperature and time.
Figure 4:
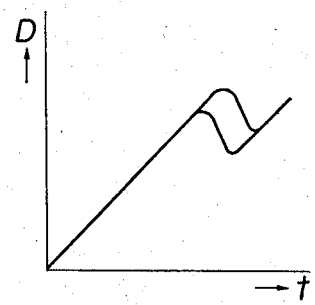
FIG. 4 shows a common transformation characteristic curve of steel to illustrate the relation between temperature and time.

On the other hand the continuous cooling transformation characteristic curve of a steel will take a form as shown in FIG. 2 wherein the ordinate represents temperatures T at which the transformation initiates and terminates when the steel is cooled at various cooling rates from a stable austenite state at elevated temperatures and the abscissa represents the cooling time $t$ required. The isothermal transformation characteristic curve of steel is shown in FIG. 3 which was plotted by quenching the steel from a point T$a$ corresponding to the austenite state to various temperatures within a range from the point T$a$ to a point M$s$ at which the transformation initiates and by measuring the time interval between the point of initiating transformation and the point of termination thereof while the temperature of steel is held constant at one of said various temperatures. FIG. 4 shows a more general transformation characteristic curve which shows the relation between the amount of expansion D and the temperature of transformation when the sample is heated and cooled at a constant rate close to the equilibrium condition, for example 1.5° C. per minute.

Apparatus adapted to measure various transformation characteristic curves such as the continuous cooling transformation characteristic curve, the isothermal transformation characteristic curve, the general transformation characteristic curve and the like outlined hereinabove are required to satisfy various conditions as follows:

(1) It should be able to homogeneously heat a sample piece at any accurately constant speed over a wide range from the room temperature up to a substantial high temperature (for example about 1400° C.).

(2) It should be able to maintain the sample over a considerable period of time without any appreciable temperature variation at an elevated temperature after the sample piece has been brought thereto by the same heating means.

(3) It should be able to cool the sample from the elevated temperature to the room temperature at any rate ranging from a very short time period (i.e., about 1 to 3 seconds) to a very long time period (i.e., approximately 20 hours or more).

(4) It should be able to quench (within 1 to 3 seconds) the sample from the point $Ta$ at an elevated temperature to any particular temperature between points $Ta$ and $Ms$ and also can accurately maintain said particular temperature over a long period.

(5) It should be able to quench the sample from said particular temperature to the room temperature.

(6) It should be able to correctly measure and record at a high accuracy various transformation phenomenon with respect to temperature and time.

Heretofore, as means for measuring various transformation characteristic of metallic materials, have been used the magnetic analysis method, the electrical resistance method, the thermal expansion method, thermal analysis method and the like method. However, as the magnetic analysis and the electric resistance methods are difficult to measure transformations at elevated temperatures, thermal expansion and thermal analysis methods have been generally used. Moreover, as most of the conventional methods of and apparatus for measuring transformations utilize heating by electric resistors they can not satisfy at one time all of the requirements above enumerated.

For example even by accurate programmed control effected by the so-called PID or SCR system which are recently developed electrical circuits, said condition (4) can not be satisfied. Accordingly it was necessary to add other heating means such as a bath of molten metal or salt to said systems so as to dip the sample in it. Yet the condition of (4), or the requirement of quenching within 1 to 3 seconds can not be met when the system is conditioned to satisfy the condition of (6). Actual cooling speed would be about 20 to 50 seconds so that it would be unable to provide correct isothermal transformation characteristics. Thus it has been impossible to provide accurate isothermal transformation characteristic curves by automatic measurements.

Another method of measuring various transformation characteristics by means of microscopes has been used. Thus, in order to obtain the isothermal transformation characteristic, a heating furnace operating at a temperature of 950° C. adapted to provide the austenite structure and another furnace operating at a temperature of 600° C. adapted to maintain a constant temperature may, for exmple, be utilized and a small piece of a metal sample is put in the heating surface to be heated to a predetermined temperature. Then the state of transformation of the sample piece is observed by means of a microscope to plot the isothermal transformation characteristic curve. However, such method of determining the characteristic curve by means of a microscope requires a great number of sample pieces, troublesome handlings and much time, and yet it is difficult to obtain accurate and satisfactory results of measurements.

An illustrative example of this invention will now be described by referring to FIG. 5 which shows a block connection diagram thereof. Where it is desired to obtain a transformation characteristic curve of a metal such as the continuous cooling transformation characteristic curve, the isothermal transformation characteristic curve or the general transformation characteristic curve, a temperature setting unit 11 and a time axis setting unit 12 are so combined as to establish a program signal with regard to the heating time $t$ and the temperature T, which is suitable for various transformations described above. This program signal is applied to a modulator 14 of a recorder 13 and is then supplied to a discriminating (synchronous rectifying) circuit 18 via a main amplifier 15 of the recorder 13 and a modulator 17 of a temperature controller 16. The discriminating circuit 18 operates to give the program control signal, under control of the temperature controller 10, to a source of high frequency power 19 comprising an oscillator. The source of high frequency power 19 operates to supply a high frequency current which is controlled by the program signal to an induction heating coil 21. When a metal sample 20 contained in the heating coil 21 is heated to expand in this manner, its expansion will be applied to a detector 23 through an expansion detecting quartz tube 22, and the expansion detected by the detector 23 will be measured and recorded by a two phenomenon recording meter 24. A thermocouple 25 is provided for the metal sample 20 to measure and record the temperature detected by the thermocouple 25 by the two phenomenon recording meter 24. A feed back circuit 10 is connected between the output of the discriminator circuit 18 and the input terminal of the modulator 17 to provide computing operations such as integrating operations in order to prevent transient phenomena such as hunting at the time of temperature variation.

The high frequency induction heating unit 19 including a high frequency oscillator functions to uniformly heat the metal sample by high frequency induction heating. This unit may be operated at a frequency in a range from 10 ks. to several hundred kc., for example, and may be provided with an output regulator to rapidly change the heating temperature. The temperature setting unit 11, the essential component of the inventive apparatus, is energized from a reference source of potential not shown in the drawing to give a temperature setting signal from a multi-element network. The time axis setting unit 12 operates to set the time axis and may comprise a digital counter circuit in which the time can be varied from 3 seconds to 20 hours, for example.

Figure 5:
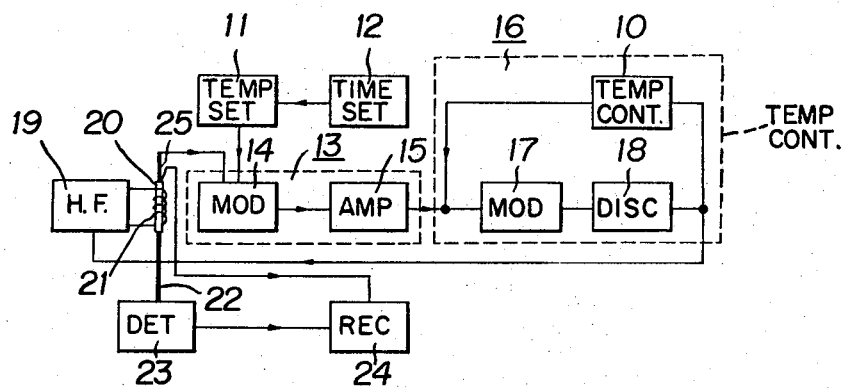
FIG. 5 is a block connection diagram of one embodiment of this invention.
Figure 6:
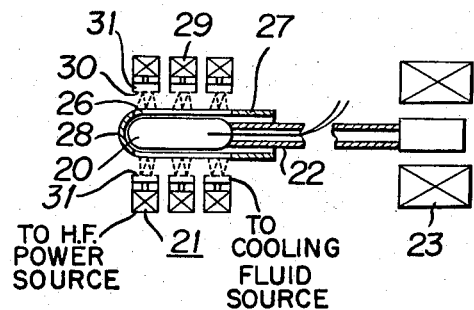
FIG. 6 is a schematic representation, partly in section, of a high frequency induction heating coil and an expansion detector utilized in the embodiment shown in FIG. 1.

FIG. 6 shows the detail of the induction heating coil 21 and the thermal expansion detector 23 which are schematically shown in FIG. 5. Thus, the metal sample 20 is disposed in a quartz tube 27 with one end closed and provided with slits 26 for accelerating cooling action. As shown, one end of the metal sample 20 is located close to the closed end 28 of the quartz tube 27 while the other end is abutting against one end of a detector quartz tube 22 concentrically inserted in the tube 27. The opposite of the detector quartz tube 22 is connected to the expansion detector 23 comprising a differential transformer or a strain gauge, for example. In the illustrated example this opposite end is fixedly secured to the magnetic core of a differential transformer.

A heating coil assembly 21 is provided to surround the quartz tube 27 containing the metal sample 20, said heating coil assembly 21 including an induction coil 29 and a coiled cooling conduit 31 provided with nozzles 30 for ejecting cooling water on the inner surface thereof. The internal diameter, the axial length and the number of turns of the heating coil assembly are suitably proportioned so as to homogeneously heat the metal sample 20.

The thermocouple 25 adapted to detect the temperature of the metal sample 20 is attached to the sample 20 through the detector quartz tube 22.

FIG. 7 shows practical construction of the induction heating coil assembly 21 and the expansion detector 23, diagrammatically shown in FIG. 6. More particularly, the quartz tube 27 containing therein the metal sample 20 is vertically disposed in a vacuum tight vessel 32. An annular flange 33 is secured to the peripheral wall of an opening provided through the upper wall of the vacuum vessel 32 to support an upright cylinder 34 having screw threads on its outer periphery. A supporting cylinder 35 is connected to the outer surface of the cylinder 34, said supporting cylinder serving to support a casing 37 of the expansion detector in the form of an inverted cup within the cylinder 34 by means of an annular rib 36. A packing 38 is interposed between the outer periphery of the casing 37 and the inner wall of the cylinder 34 to hermetically seal the vacuum vessel 32.

The lower end of the casing 37 is closed by a plate 39 to suspend the quartz tube 27 in the vacuum vessel 32 from the lower surface of the plate 39 through a support 40.

The plate 39 is provided with a perforation 41 through which is extending a rod 42 which is connected to the expansion detecting quartz tube 22 inserted in the quartz tube 27 and the upper end of the rod 42 is connected to a magnetic core 43 of a differential transformer comprising the expansion detector. The core 43 and the rod 42 are contained in an auxiliary vacuum vessel 44 which is sealed around the perforation 41. Thus, the interior of the auxiliary vacuum vessel 44 communicates with the interior of the main vacuum vessel 32 via the perforation 41. A coil 45 of the differential transformer is disposed on the outside of the auxiliary vacuum vessel to surround the core 43. The coil 45 is suspended from the top plate of the casing 37 for the expansion detector 37 by means of a screw rod 46. At the bottom of the vacuum vessel 32 there is provided an opening 47 through which the interior of the vacuum vessel is evacuated by a suitable vacuum pump, not shown. A heating coil 29 is disposed to surround the lower portion of the tube 22. Although not shown in the drawing a suitable cooling means may be associated with the heating coil 29 as has been described in connection with FIG. 6.

FIG. 8 shows an enlarged perspective view of the lower portion of the quartz tube 27. As shown, a pair of legs 49 and 50 are formed by machining the opposite sides of the tube near its bottom and a circular disc 28 is connected to the lower ends of the legs 49 and 50. Thus, a slit 26 is defined by these legs and the disc 28 serves to support a sample of metal which is mounted thereon through the slit 26. As shown a slot 51 is cut in the upper surface of the disc 28 to permit easy insertion and removal of the sample as well as the thermocouple. When the thermocouple 25 is attached to the sample through this slot it is not necessary to insert the thermocouple through the quartz tube 22 as shown in FIG. 6.

FIG. 9 shows a sample of a shape suitable to be mounted in the quartz tube 27 shown in FIG. 8. As shown, the sample is made of a cylindrical rod that can be inserted in the tube 27. Depressions 52 and 53 are formed in the opposite ends of the sample, the upper depression being adapted to receive therein one end of the detecting quartz tube 22. Thus the expansion of the main body 54 of the sample 20 will be transmitted to the detector whereas annual thin end portions 55 and 56 function to ensure homogeneous heating of the main body 54.

Figure 10:
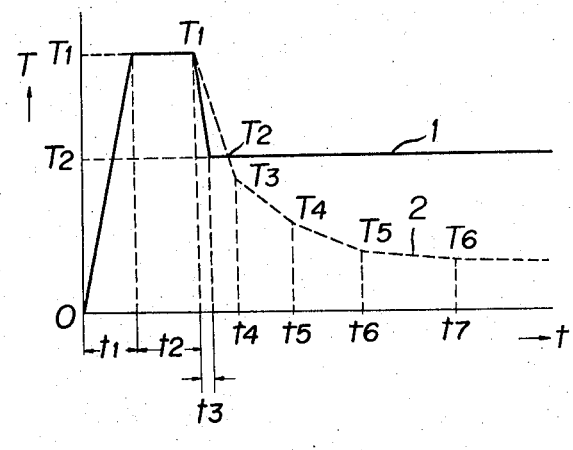
FIG. 10 is a graph which illustrates the relation between temperature and time to explain one application of the apparatus of this invention.

The operation of the apparatus shown in FIG. 7 is as follows: After breaking the vacuum of the vacuum vessel 32, the sample 20 is mounted on the disc 28 through a window (not shown) provided in the side wall of the vacuum vessel 32. After the vacuum vessel 32 has been evacuated the supporting cylinder 35 will be rotated to pull up the detector casing 37 together with the quartz tube 27 to align the sample 20 with the high frequency coil 21. At the same time the screw rod 46 is turned to align the coil 45 of the differential transformer with its core 43. As shown, while the core 43 is maintained in a high vacuum the coil 45 is subjected to the atmospheric pressure so that its characteristic may not be affected. In this manner, with the construction described above the metal sample can be readily exchanged by moving the quartz tube containing together with the expansion detecting mechanism so as to selectively align the sample with the high frequency coil. Curves shown in FIG. 10 show the relation between the heating time $t$ and the temperature T when a metal sample is heated by the apparatus of this invention shown in FIGS. 5 through 9. More particularly, where it is desired to obtain a variation in the heating temperature as indicated by solid line 1, the temperature setting unit 11 and the time axis setting unit 12 are set such that to provide a program signal corresponding to the time—temperature relation as indicated by the solid line 1. When a program signal effective to elevate the temperature of the sample from zero to $T_1$, during the interval of time $t_1$ is given to the modulator 14 of the temperature recording unit 13, the discriminating circuit 18 of the temperature control unit 16 will give the program control signal to the source of high frequency power 19. Thus the source 19 will supply a high frequency power to the induction heating coil 21 which is just sufficient to elevate the temperature of the metal sample from zero to $T_1$. By suitable combination of the temperature setting unit 11 and the time axis setting unit 12 any desired setting of time $t_1$ and temperature $T_1$ can be made, for example $t_1=3$ seconds, $T_1=1400°$ C. or $t_1=20$ hours and $T_1=800°$ C.

It is possible to preset the program signal such that to maintain the sample at the temperature $T_1$ for a time interval $t_2$, then to decrease the temperature from $T_1$ to a lower temperature $T_2$ and finally to maintain the sample at this temperature for a long time. Where this time interval $t_3$ is set to a relatively short length, for example three seconds, the cooling speed by the cooling atmosphere ejected from the cooling nozzle 30 associated with the induction heating coil 21 should be made very high, for example less than one second, and at the same time the response speed of the temperature controller 16 should also be made very high. Further, in order to stably transfer from the temperature $T_1$ to the constant temperature $T_2$ the feed back circuit 50 is constructed to provide an appropriate computing operation whereby to stop the cooling upon approach of the temperature to $T_2$, thus preventing any transient phenomena such as hunting. The amount of feed back provided by this feed back circuit 10 is generally approximately 100%. Accordingly, the time lag in the time constant inherent to the temperature controller unit 16 should be minimum which is necessary for the stable operation of the system. To this end in accordance with this invention, use of any undesirable delay element such as a filter circuit and the like is avoided and a high frequency carrier wave of the order of 400 to 1000 cycles per second is used for the modulator 19 instead of a commercial frequency, viz. 50 or 60 cycles per second, thus decreasing the time constant of the discriminating circuit 18 and fastening the response of the output signal.

Where the relation between the heating time $t$ and the temperature T as represented by a dotted line 2 of FIG. 10 is desired the temperature setting unit 11 and the time axis setting unit 12 are so combined as to give a program signal corresponding to the curve $T_1$–$T_3$–$T_4$–$T_5$–$T_6$ to the modulator 14 thereby to heat and cool the metal sample in accordance with the curve 2.

Figure 11:
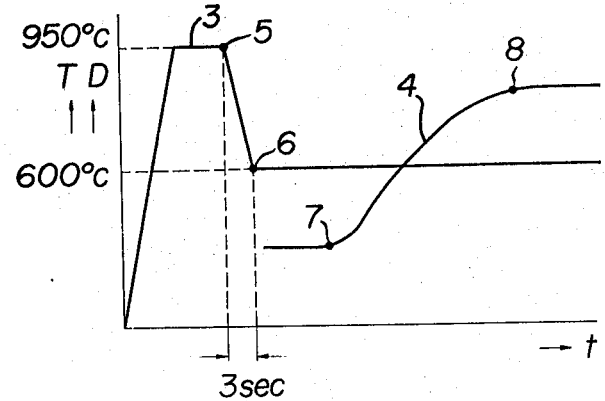
FIG. 11 shows an example of an isothermal transformation characteristic curve measured by the apparatus of this invention and also illustrates the relation between temperature and time.

FIG. 11 shows one example of measuring the transformation characteristics of steel to plot the isothermal transformation characteristic curve thereof through the use of the apparatus described hereinabove, wherein the abscissa represents the time $t$ and the ordinate the heating temperature T and the amount of expansion D. A curve 3 represents the relation between the heating time $t$ and the heating temperature T, whereas a curve 4 the relation between $t$ and the amount of expansion D of a steel sample heat treated in accordance with the curve 3. It is to be understood that these two curves 3 and 4 are recorded simultaneously by two pens of the two phenomena recording meter 24 shown in FIG. 6. More particularly, a point 5 on the curve 3 indicates the point at which cooling is initiated after the sample has been maintained at 950° C. and a point 5 indicates the point at which cooling is terminated and thereafter the sample is to be maintained at a predetermined constant temperature, that is 600° C. in this experiment. Between the points 5 and 6 the sample was cooled at a very rapid rate, for example in about 3 seconds. By the circuit shown in FIG. 5 it is easy to provide an ideal temperature—time curve to obtain the desired isothermal transformation characteristic curve, which enables to smoothly transfer to the set temperature value of 600° C. at the point 6 without accompanying any hunting and also to closely regulate the temperature within a range of ±1° C.

The curve 4 indicates a record of the variation in the amount of expansion caused by the heat treatment according to the curve 3. As can be noted from this curve while the sample was maintained at the constant temperature of 600° C., the transformation of the sample was begun at a point 7 and terminated at a point 8, as clearly recorded by the expansion recorder shown in FIG. 7. Thus it is evident that the apparatus constructed in accordance with the principle of this invention enables ideal measurements of transformations of metal.

In summary, this invention is characterized in effecting the heat treatment of a metal sample by high frequency induction heating, precisely presetting the heat treatment characteristic of the sample by unique correlation between high frequency heating and cooling condition and clearly recording the expansion of the sample due to its transformation. Further various types of transformation characteristic curves of metal samples, such as the continuous cooling transformation characteristic curves, isothermal transformation characteristic curves and general transformation characteristic curves can be accurately plotted by the same apparatus. These characteristic curves can be advantageously utilized in determining the conditions of heat treatment of metallic materials.

What is claimed is:

1. Apparatus for measuring transformation characteristics of metallic materials comprising in combination, a vacuum vessel including opening means to pass a sample therein, a support for said vacuum vessel over said vessel; an elongated quartz tube passing from said support vertically into said vessel; a sample chamber defined at the lower end of said tube including a floor and elongated wall openings for the passage of cooling gas into the chamber with a slit in said floor for passing a knife edge with a sample thereon along said slit and depositing the sample on said floor; a quartz rod passing through said tube disposed so that the lower end thereof will abut against a sample in said chamber and the upper end thereof extending into said support with a magnetic core at the upper end; a differential transformer disposed in said support surrounding said magnetic core sensing the vertical movement of said magnetic core caused by the expansion action of a sample acting on said rod lower end; a high frequency induction heating coil disposed around said chamber including leads for connection to a high frequency power source; a cooling tube means disposed between said chamber and said heating coil with apertures therein opposite said chamber for the passage of a quenching gas through said cooling tube means onto a sample located in said chamber; and electrical programming means coupled to said heating coil and to said cooling tube means for rapidly heating and quenching said sample over a predetermined programme, including recording means for recording the expansion of said sample during said programme.

2. An apparatus as claimed in claim 1 said programming means including a temperature setting first unit; a time axis setting second unit connected in cooperative relationship with said first unit to establish a programme signal corresponding to a predetermined temperature and time curve; a temperature recorder and a temperature controller connected to control said heating coil and to said cooling tube means; and, said recording means being connected to said differential transformer to record the amount of expansion of the sample detected by said quartz rod.

3. An apparatus as claimed in claim 2 wherein said cooling tube means includes a cooling coil disposed alongside and radially inwards of said heating coil.

4. An apparatus as claimed in claim 3 including adjustment means between said support and said quartz tube to adjust the vertical position of said chamber with regard to said induction heating coil and cooling tube.

References Cited
UNITED STATES PATENTS 3,028,754    4/1962    Huyser _____ 73—16

OTHER REFERENCES

Lloyd, L. T., Recording Quartz Differential Dilatometer, July 1959, pp. 7–24, Figures 2, 5 and 11.

Fulkerson, S. D., Apparatus for Determining Linear Thermal Expansions of Materials in Vacuum or Controlled Atmosphere, January 1960, pp. 1–4 and 5.

JAMES J. GILL, *Primary Examiner.*

RICHARD C. QUEISSER, *Examiner.*

E. E. SCOTT, *Assistant Examiner.*